May 26, 1970 P. J. IMSE 3,513,964
ARTICLE CARRYING CHAIN HAVING UNITARY GUIDE MEMBERS
ATTACHED TO THE BOTTOM OF THE LINKS
Filed April 2, 1968
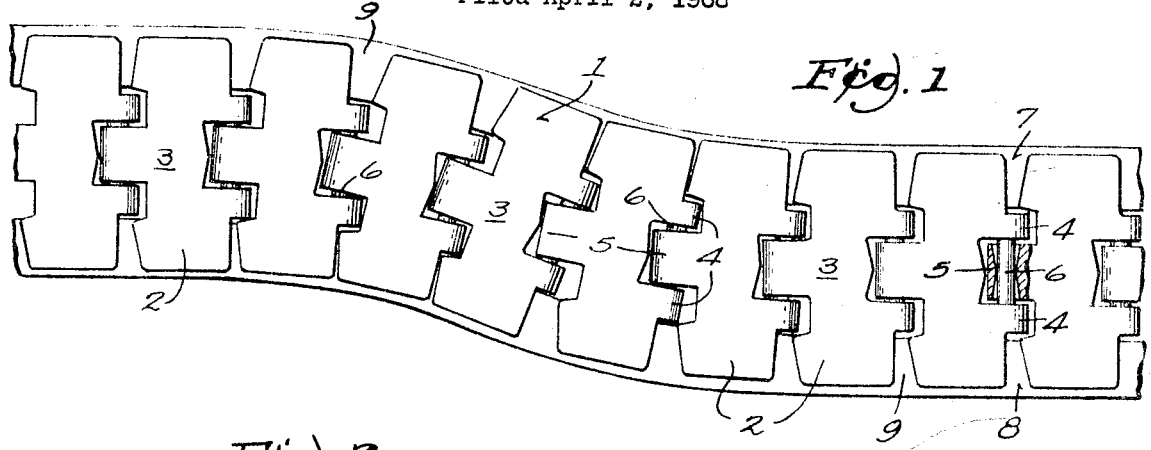
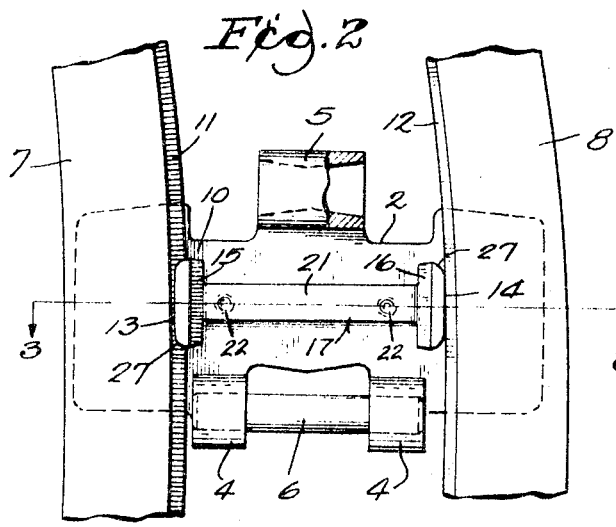
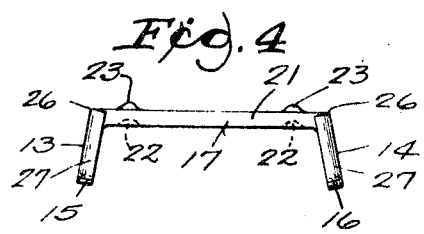
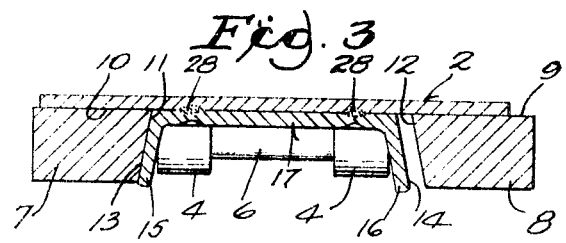
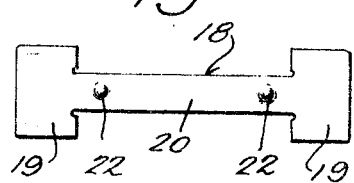
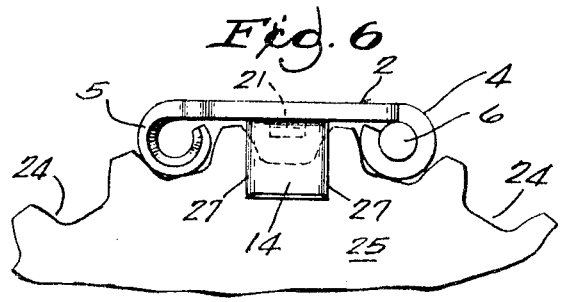

United States Patent Office 3,513,964
Patented May 26, 1970

3,513,964
ARTICLE CARRYING CHAIN HAVING UNITARY GUIDE MEMBERS ATTACHED TO THE BOTTOM OF THE LINKS
Philip J. Imse, Wauwatosa, Wis., assignor to Rex Chainbelt Inc., Milwaukee, Wis., a corporation of Wisconsin
Filed Apr. 2, 1968, Ser. No. 718,038
Int. Cl. B65g
U.S. Cl. 198—189                    3 Claims

ABSTRACT OF THE DISCLOSURE

An article carrying chain for travel in either a straight or curved path having a one-piece guide and wear member attached to the flat underside of each link. The ends of the member project downwardly to form a pair of guide and wear shoes adapted respectively to slide against one or the other of a pair of associated stationary wear strips in a manner to guide the chain and prevent chain tension from causing the chain to tilt out of a horizontal plane when it is moving in a curved path.

BACKGROUND OF THE INVENTION (1) Field of invention

This invention relates to improvements in conveyor chains and, specifically, to improvements in the guide and wear means used with laterally flexible flat top conveyor chains having a series of interfitting, pin-connected metal links adapted to operate upon and to be guided by a pair of stationary parallel wear strips.

(2) Description of the prior art

Flat top conveyor chain links which are formed with spaced curled knuckles and connected by hinge pins extending through the alinged bores of the interfitting knuckles of adjacent links are known in the art. The knuckles of the links also serve as teeth which fit in the pockets between the teeth of the sprocket used to drive the conveyor. It is also known in the art to provide for lateral flexing between adjacent links so that the assembled chain may be operated in a curved path. Chains of this type operate upon a pair of spaced parallel wear strips which have flat upper surfaces upon which the flat undersides of the links slide, thereby maintaining the chain in a horizontal plane. Additionally, it is known in the art to provide the links of the chain with wear shoes to guide the chain and to provide positive resistance to the forces of chain tension which may tilt or lift the chain out of the horizontal plane when it is traveling in a curved path. Wear shoes of the prior art have been formed both as integral lateral extensions of the knuckles and as independent portions of the link either attached to or formed as integral extensions of the underside of the link. These prior art wear shoes have been formed with outwardly facing surfaces adapted to slidably engage corresponding inside surfaces of the wear strips in a manner to prevent the above described tilting or lifting of the chain.

In order to avoid placing additional stresses on wear shoes of the prior art type of construction where the shoes are integral extensions of the knuckles, another prior art construction uses a pair of wear shoes formed independently of the link and attached to the flat underside thereof as by welding. This prior art construction is the subject of the pending application for U.S. patent, entitled Laterally Flexible Flat Top Conveyor with Metal U-Shaped Guide Contacting Members Welded to the Bottom of the Links and filed Dec. 8, 1967, Ser. No. 691,282 of which the present inventor is a joint applicant. Where a pair of separately formed wear shoes are used, each must be separately positioned and welded or otherwise attached to the link; this results in a substantial increase in the manufacturing time of a completed link.

When the conveyor chain is operating in a curved path, chain tension produces a lateral force on the wear shoe in contact with the wear strip. Where the wear shoe is individually welded to the underside of the link, the lateral force induces a bending stress in the wear shoe resulting in undesirable tensile stresses in the welds.

SUMMARY OF THE INVENTION

In the present invention the wear shoes are joined by an intermediate connecting bar to form a one-piece guide member which may be attached to the flat underside of the link approximately midway between the knuckles thereof. The guide member may be formed by various methods and of different materials. In metallic form the member may be cast, forged, or formed of powdered metal or sheet metal. The member may also be molded of plastic or similar material.

In its preferred embodiment the one-piece guide member is initially stamped from a piece of flat sheet metal. The ends of the member are then bent down to form the wear shoes. The portion intermediate the ends forms the connecting bar and, when the member is attached to the link by welding or otherwise securing the intermediate connecting bar to the flat underside of the link, the outer lateral surfaces of the wear shoes are disposed at the appropriate acute angles to said underside.

A relatively sharp corner should be formed by the outer surface of the wear shoe and the upper surface of the connecting bar so that the flat outer surface of the wear shoe has substantial contact with the wear strip. This is provided by cold coining the wear shoes so that their upper surfaces are flush with the upper surface of the connecting bar. In a preferred manner, the ends are bent down to form the wear shoes and at the same time are jammed or pressed up and in toward the connecting bar portion as in a die, not shown.

The size and spacing of the knuckles are such that the chain may operate over a double-tooth sprocket having two teeth per chain pitch. Such sprockets are customarily provided with an odd number of teeth for equalized and extended wear of all teeth.

According to the present invention, the intermediate connecting bar of the guide member is of sufficiently reduced cross section that it will fit in the pocket between the knuckle-receiving pockets of such a drive sprocket.

The connecting bar may be secured to the underside of the link as by a pair of laterally spaced projection welds. The unitary structure of the guide member is such that the stresses in the securement means induced by the lateral forces of chain tension are primarily shear stresses. Also, undesirable bending stresses are reduced to a minimum by spacing the securement means as far apart as practicable.

BRIEF DESCRIPTION OF THE DRAWING

FIG. 1 is a top plan view of a portion of a conveyor incorporating a chain of the present invention with the central knuckle of one link shown in section.

FIG. 2 is a bottom plan view partly in section of a portion of the conveyor shown in FIG. 1.

FIG. 3 is a vertical section taken on line 3—3 of FIG. 2.

FIG. 4 is a front elevation of the guide member.

FIG. 5 is a bottom plan view of the metal stamping from which the guide member is formed.

FIG. 6 is a side elevation view of a link the chain of the present invention showing its operation with the drive sprocket of the conveyor.

DESCRIPTION OF THE PREFERRED EMBODIMENT

A laterally flexible article carrying conveyor chain 1 is formed from a series of interfitting pin-connected links. Each link 2 has a flat conveying surface 3 from which depends in one direction a pair of laterally spaced knuckles 4 and in the other direction a central knuckle 5. A connecting pin 6 is secured in the bores of the laterally spaced knuckles 4 an extends through the bore of the interfitting central knuckle 5 of the adjacent link 2. The bore of the central knuckle is elongated so tha the link may flex laterally with respect to the adjacent interconnected link.

The assembled chain 1 is adapted to operate upon a pair of spaced parallel stationary wear strips 7 and 8. The wear strips have flat horizontal upper surfaces 9 which slidably support the flat undersides 10 of the links 2 and maintain the chain in a horzontal plane.

Additionally, the wear strips 7 and 8 serve to guide the chain and hold it in a horizontal plane as it moves in a curved path. To accomplish this, the wear strips 7 and 8 are provided with inclined inside surfaces 11 and 12, respectively, adapted to be slidably engaged by corresponding outer surfaces 13 and 14 of wear shoes 15 and 16 depending downwardly from the undersides of the links.

As shown in the drawings, wear shoes 15 and 16 are integral parts of the guide member 17 formed from the sheet metal stamping 18 of FIG. 5. The ends 19 of the stamping are bent down from the narrower intermediate portion 20 to form the wear shoes 15 and 16. The intermediate portion 20 forms a connecting bar 21 by which the guide member 17 is attached to the flat underside 10 of the link 2.

The guide member 17 is preferably attached to the link by projection welding, although rivets, brazing or suitable adhesives may also be used. To provide metal for the projection welds the intermediate portion 20 of the sheet metal stamping 18 is dimpled to form depressions 22 on the underside thereof. The displacement of metal by dimpling produces projections 23 on the opposite or upper side of the intermediate portion 20, said projections providing the metal for projection welding in a known manner.

The guide member 17 is attached to the underside 10 of the link 2 midway between the laterally spaced knuckles 4 and the central knuckle 5 as is best shown in FIG. 2. The spacing of the knuckles or the pitch of the chain is such that the knuckles fit alternate pockets 24 between the teeth of the drive sprocket 25 as shown in FIG. 6. The connecting bar 21 of the guide member 17 is of sufficiently reduced cross-section so that it will fit in the pocket 24 intermediate the knuckle-receiving pockets of the sprocket 25 and not interfere with the engagement of the knuckles with the sprocket.

To guide the chain in a curved path, the wear shoes 15 and 16 of the guide member 17 have outer surfaces 13 and 14, respectively, disposed to slidably engage the corresponding inside surface 11 or 12, respectively depending on the direction of curvature of the wear strips 7 and 8. For example, chain tension will cause the chain to be drawn laterally against the wear strip on the inside of the curve, as wear strip 7 in FIGS. 2 and 3. The angularity of surfaces 11 and 13 and of 12 and 14 is preferably just sufficient to be sure that the chain is positively held down on the wear strips or to offset any effect of chain tension acting to lift the chain vertically from the wear strips 7 and 8, as is known in the art.

In order to provide maximum surface contact between the outer surfaces 13 and 14 and the inclined inside surfaces 11 and 12, the guide member 17 is pressed into a die to provide sharp bends or corners 26 between the outer surfaces 13 and 14 of the wear shoes 15 and 16 and the upper surfaces 13 and 14 of the wear shoes 15 and 16 and the upper surface of the connecting bar 21.

The ends 27 of the wear shoes are rounded to provide smooth approach surfaces as the links slide in engagement with the wear strips for chain travel in either direction.

As the chain travels in a curved path, chain tension causes the chain to be drawn to the inside of the curve against the inside wear strip 7, FIGS. 2 and 3. A substantial lateral force is thus exerted against the inside wear shoe 15. The unitary structure of the guide member 17 allows the lateral force on the wear shoe to be transmitted to the connecting bar 21. The projection welds 28 which secure the connecting bar 21 to the underside 10 of the link are placed primarily shear in resistance to the force. However, because the line of the force against the wear shoe 15 is offset below the line of the projection welds 28, there will unavoidably be bending stresses induced in the welds. The stresses place the weld on the inside of the curve in tension and the weld on the outside and compression, the two forming a couple in resistance to the bending moment produced by the lateral force. By spacing the two welds 28 as far apart as possible on the connecting bar 21, the moment arm between them may be increased to the point where the tensile and compressive forces on the welds, and consequently the stresses induced thereby, are reduced to a practical minimum.

While the invention has been particularly shown and described with reference to a preferred embodiment thereof, it will be understood by those skilled in the art that various changes in form and details may be made therein without departing from the spirit and scope of the invention.

What is claimed is:

1. In a laterally flexible flat top conveyor chain comprising a series of one-piece metal links having flat undersides for sliding support on spaced parallel stationary wear strips and spaced pin-connected interfitting knuckles extending below said undersides to be received or to fit in the pockets of a drive sprocket, a guide member for each link comprising downwardly extending wear shoes disposed at an acute angle to the underside of the link to engage respectively the adjacent sides of said wear strips, said sides being disposed parallel to said wear shoes, and an intermediate connecting bar lying flat against and having connection with the underside of the link, said connecting bar lying between and spaced from the knuckles of the link and being of such reduced cross section that the chain can operate over a drive sprocket with the knuckles fitting alternate pockets of the sprocket having preferably an odd number thereof.

2. A guide member as defined in claim 1 wherein said connection with the underside of the link comprises a pair of laterally spaced projection welds.

3. A guide member as defined in claim 2 wherein said welds are disposed near the ends of said intermediate connecting bar to provide between them a moment arm of maximum length, whereby the stresses induced in said welds in resistance to lateral forces are reduced to a minimum.

References Cited

UNITED STATES PATENTS 3,047,130  7/1962  Resener _____ 198—189
3,262,550  7/1966  Kampfer _____ 198—189

RICHARD E. AEGERTER, Primary Examiner

U.S. Cl. X.R.

198—195